W. V. WALLACE.
SYRINGES.
No. 185,464. Patented Dec. 19, 1876.
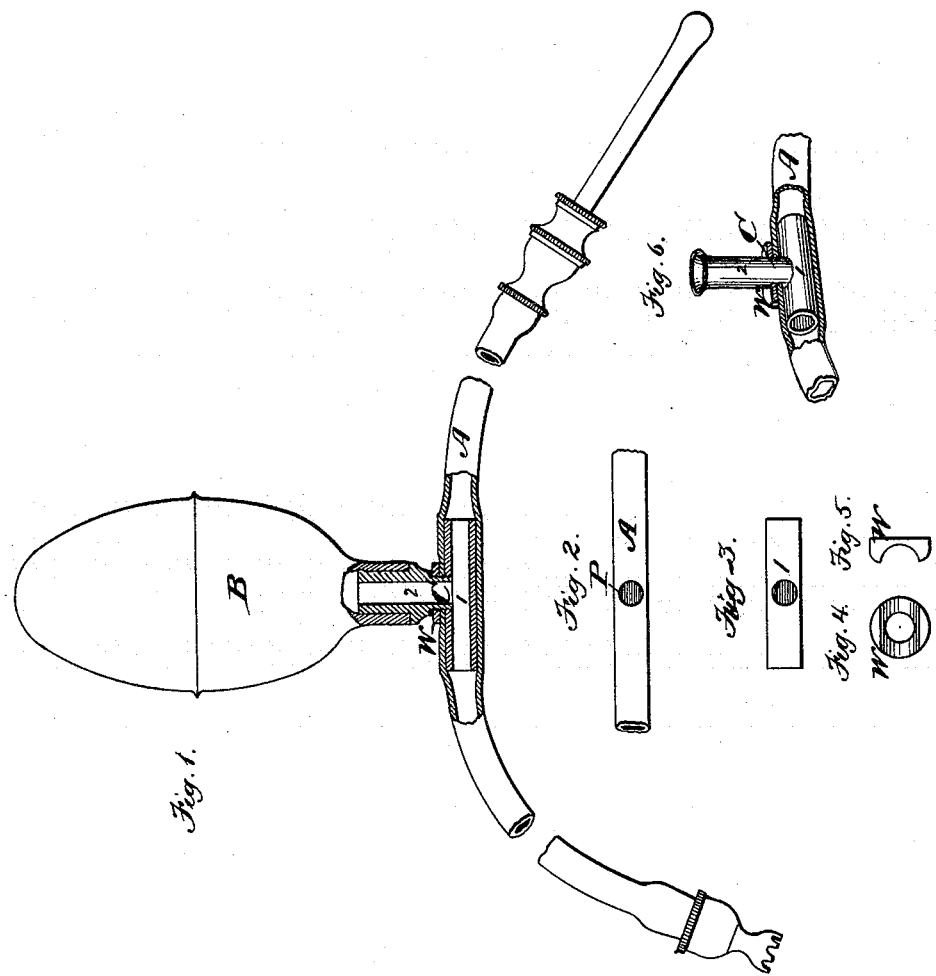
Witnesses.
C. F. Brown
A. E. Denison
Inventor.
W. V. Wallace
THE GRAPHIC CO. N.Y.

UNITED STATES PATENT OFFICE.

WILLIAM V. WALLACE, OF BOSTON, MASSACHUSETTS.

IMPROVEMENT IN SYRINGES.

Specification forming part of Letters Patent No. 185,464, dated December 19, 1876; application filed June 15, 1876.

*To all whom it may concern:*

Be it known that I, WM. V. WALLACE, of the city of Boston, county of Suffolk, and State of Massachusetts, have invented a new and useful Improvement in Syringes; and I do hereby declare that the following is a full and exact description.

The object of my invention is in a syringe with a single elastic tube which acts as an induction and eduction medium to form a bulb-connection in a simple and practical manner, which I now proceed to explain and point out in my claim, reference being had to the annexed drawings, in which—

Figures 1 and 2 show a sectional view of the devices for uniting the elastic tube at C to the bulb. Figs. 4 and 5 show the grooved washer; A, the elastic tube, which is perforated at P in its side, and the metal joint is inserted as shown in Fig. 6.

The washer W is formed concave on its lower side to clasp the tubing tightly, and being pressed firmly down by means of the bulb being forced upon part 2. Part 2 may be made separately and provided with a screw-thread, and adapted to press the washer upon the elastic tube. The groove in the part of the washer which fits over the tubing prevents the washer from turning and twisting the rubber out of place as the part 2 is screwed down, and thus forms an improved and perfectly air-tight joint, not liable to get out of order.

Having described my invention, I claim—

In a syringe having a single elastic tube adapted to form an induction and eduction medium, and united midway to a bulb, the metal washer W, concaved upon its lower side to press firmly the rubber tube to the interior metal core 1, said washer fitting loosely over the tube 2, all arranged as and for the purpose described.

WM. V. WALLACE.

Witnesses:
C. F. BROWN,
A. E. DENISON.